United States Patent [19]

Shibazaki

[11] Patent Number: 4,751,585

[45] Date of Patent: Jun. 14, 1988

[54] METHOD OF AND APPARATUS FOR GENERATING HIGH-RESOLUTION BINARY IMAGE DATA WITH RESPECT TO LINEAR EDGES

[75] Inventor: Hiroshi Shibazaki, Kyoto, Japan

[73] Assignee: Dainippon Screen Mfg. Co., Ltd., Kyoto, Japan

[21] Appl. No.: 20,195

[22] Filed: Feb. 26, 1987

[30] Foreign Application Priority Data

Feb. 28, 1986 [JP] Japan .................................. 61-44639

[51] Int. Cl.$^4$ ............................................. H04N 1/40
[52] U.S. Cl. .................................... 358/294; 358/280; 358/282
[58] Field of Search ................ 358/280, 282, 284, 294

[56] References Cited

U.S. PATENT DOCUMENTS

| | | | |
|---|---|---|---|
| 4,237,495 | 12/1980 | Yamamoto | 358/282 |
| 4,280,144 | 7/1981 | Bacon | 358/280 |
| 4,570,186 | 2/1986 | Kurata | 358/282 |
| 4,577,235 | 3/1986 | Kannapell | 358/282 |
| 4,626,902 | 12/1986 | Yamada | 358/280 |

*Primary Examiner*—Howard W. Britton
*Attorney, Agent, or Firm*—Lowe, Price, LeBlanc, Becker & Shur

[57] ABSTRACT

An image data extracting circuit extracts multi-gradation image data obtained by reading a binary original by prescribed image regions about a pixel to be processed and latches the same. A linear edge detecting circuit detects a pixel to be processed corresponding to a linear edge portion of the original that is in conformity to the scanning direction by mutually comparing the gradients of the respective latched pixels. The circuit outputs a signal expressing linear edge patterns thereof and a signal expressing the gradient, i.e., density thereof. A second high-resolving circuit receives the signals to generate high-resolution binary image data forming a smooth linear edge having a resolution higher than the read resolution with an average density in response to the gradient of the pixel to be processed.

6 Claims, 17 Drawing Sheets

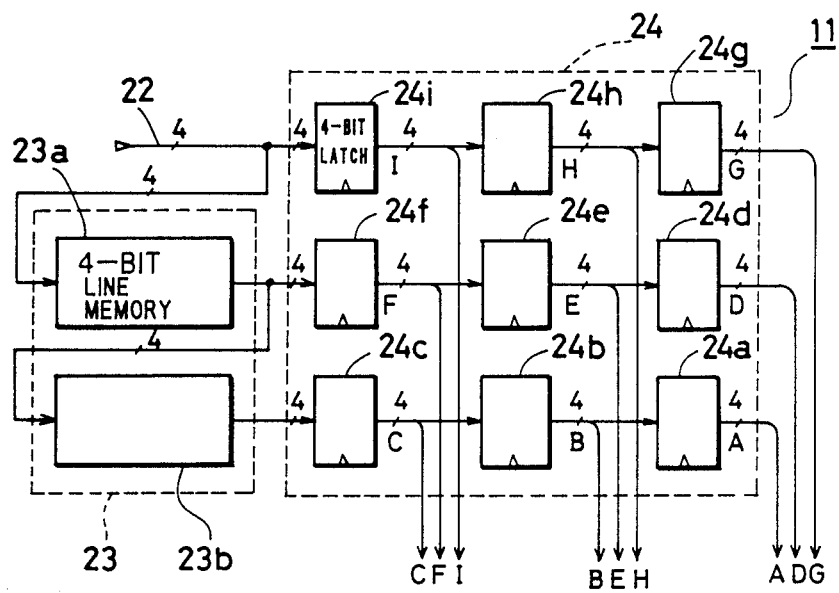

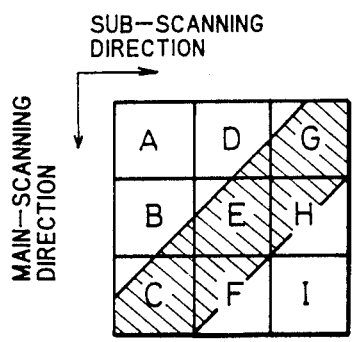
FIG.6a
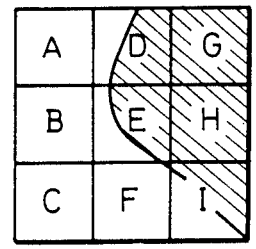
FIG.7a
| 0 | 2 | 13 |
|---|---|---|
| 2 | 13 | 8 |
| 12 | 8 | 0 |
FIG.6b
| 0 | 10 | 15 |
|---|---|---|
| 0 | 9 | 15 |
| 0 | 0 | 8 |
FIG.7b
| 0 | 0 | 1 |
|---|---|---|
| 0 | 13 | 1 |
| 1 | 1 | 0 |
FIG.6c
| 0 | 1 | 1 |
|---|---|---|
| 0 | 9 | 1 |
| 0 | 0 | 1 |
FIG.7c
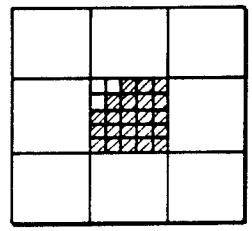
FIG.6d
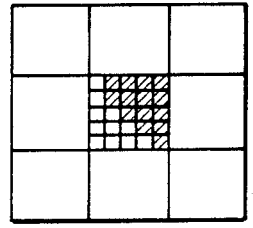
FIG.7d

FIG. 8A

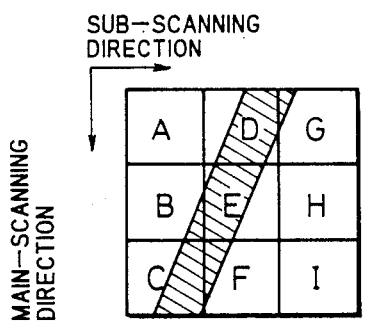

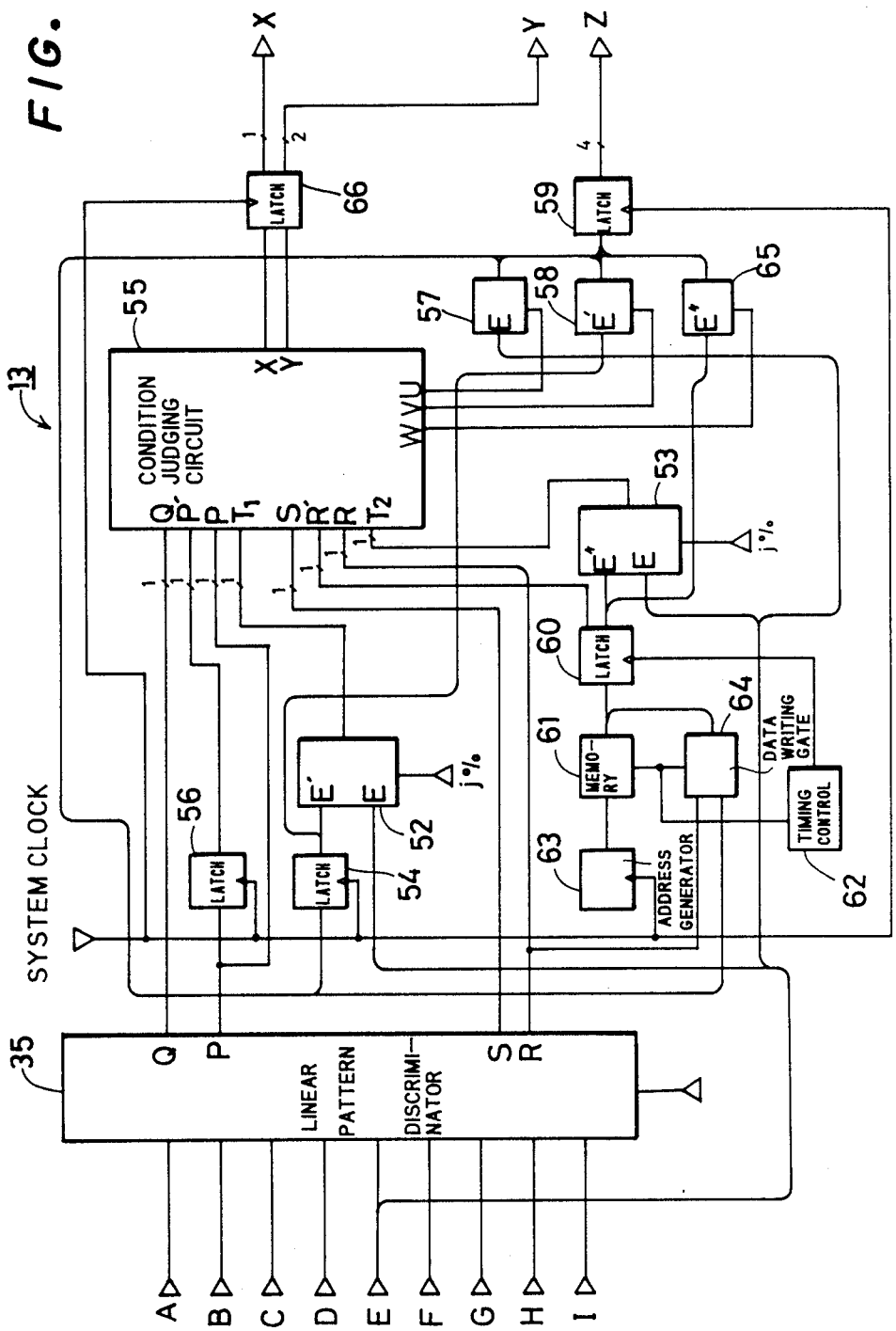

FIG.16a
| A | D | G |
|---|---|---|
| B | E | H |
| C | F | I |
FIG.16b 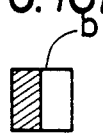  FIG.16d
FIG.16c  FIG.16e
FIG. 18
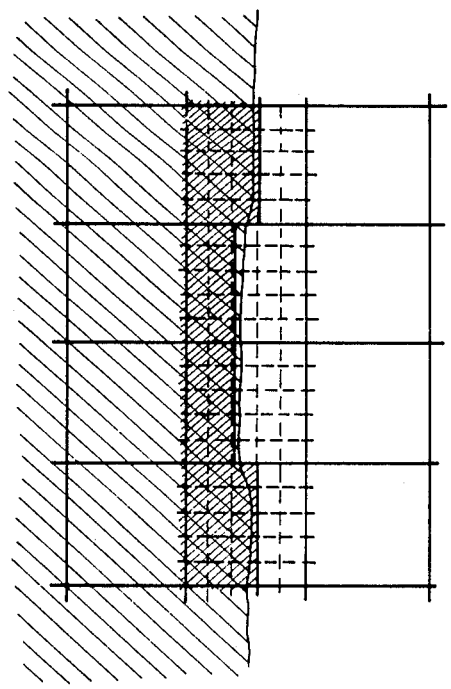

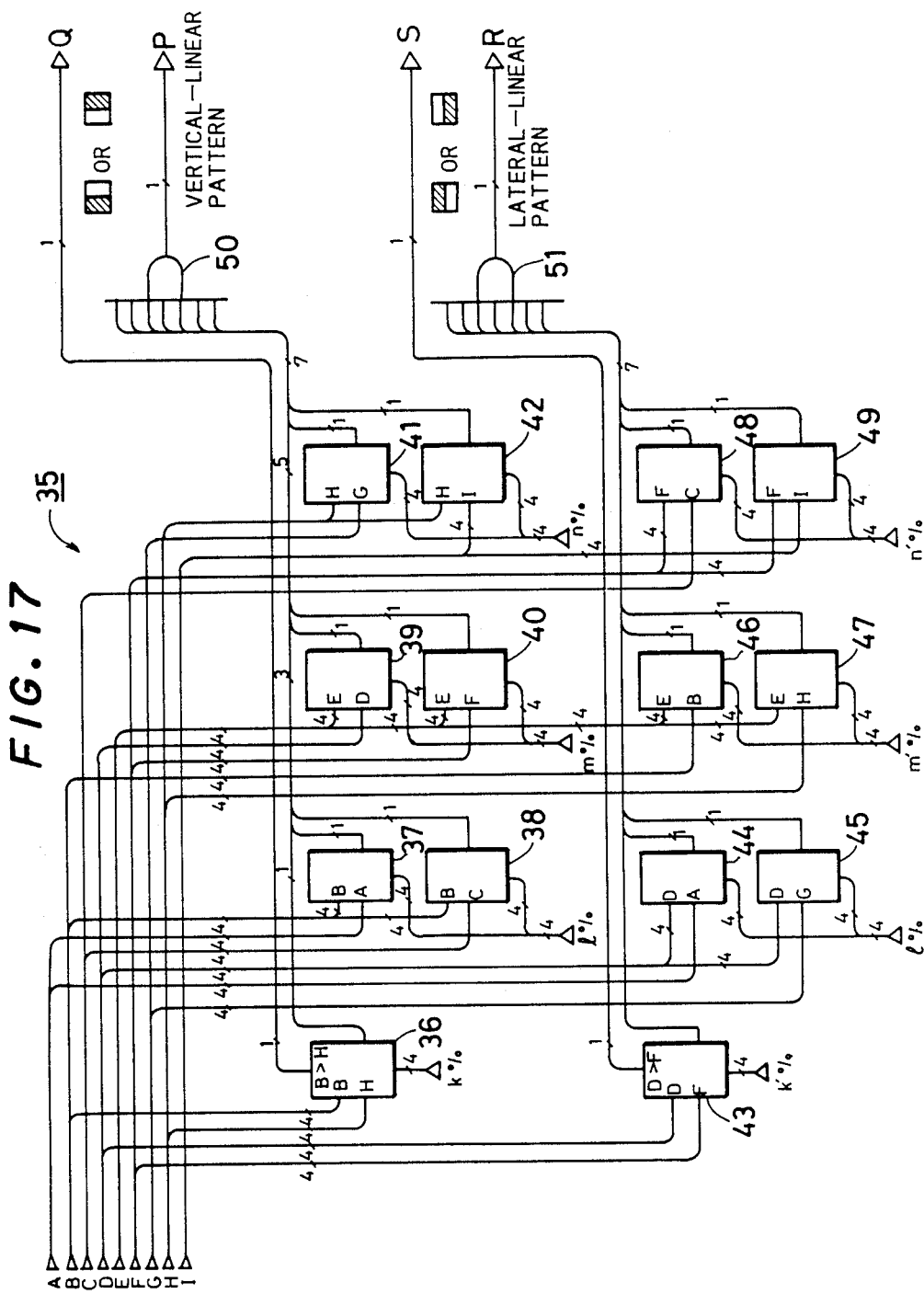

FIG. 19

| | P | P' | E' | T₁ | X | Y | Z |
|---|---|---|---|---|---|---|---|
| E₁ | 0 | | | | 0 | | |
| E₂ | 0 | 0 | | | 0 | | |
| E₃ | 1 | 0 | | | 1 | 0 | E₃ |
| E₄ | 1 | 1 | E₃ | $0$ $(E_4 \doteq E_3)$ | 1 | 0 | E₃ |
| E₅ | 1 | 1 | E₃ | $0$ $(E_5 \doteq E_3)$ | 1 | 0 | E₃ |
| E₆ | 1 | 1 | E₃ | $0$ $(E_6 \doteq E_3)$ | 1 | 0 | E₃ |
| E₇ | 1 | 1 | E₃ | $0$ $(E_7 \doteq E_3)$ | 1 | 0 | E₃ |
| E₈ | 1 | 1 | E₃ | $0$ $(E_8 \doteq E_3)$ | 1 | 0 | E₃ |
| E₉ | 1 | 1 | E₃ | $0$ $(E_9 \doteq E_3)$ | 1 | 0 | E₃ |
| E₁₀ | 1 | 1 | E₃ | $1$ $(E_{10} \neq E_3)$ | 1 | 0 | E₁₀ |
| E₁₁ | 1 | 1 | E₁₀ | $0$ $(E_{11} \doteq E_{12})$ | 1 | 0 | E₁₀ |
| E₁₂ | 0 | 1 | E₁₀ | | 0 | | |
| E₁₃ | 0 | 0 | | | 0 | | |
| E₁₄ | 0 | 0 | | | 0 | | |
| E₁₅ | 1 | 0 | | | 1 | 1 | E₁₅ |
| E₁₆ | 1 | 1 | E₁₅ | $0$ $(E_{16} \doteq E_{15})$ | 1 | 1 | E₁₅ |
| E₁₇ | 1 | 1 | E₁₅ | $0$ $(E_{17} \doteq E_{15})$ | 1 | 1 | E₁₅ |
| E₁₈ | 1 | 1 | E₁₅ | $0$ $(E_{18} \doteq E_{15})$ | 1 | 1 | E₁₅ |

FIG. 20

F I G. 2 1
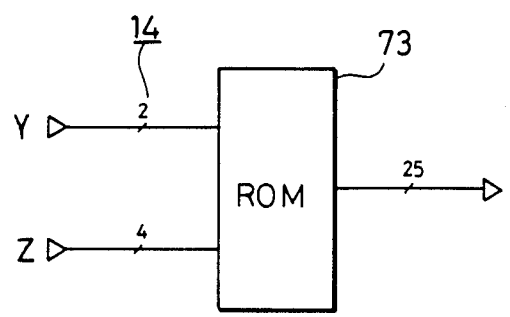

METHOD OF AND APPARATUS FOR GENERATING HIGH-RESOLUTION BINARY IMAGE DATA WITH RESPECT TO LINEAR EDGES

BACKGROUND OF THE INVENTION

1. Field of the Invention

The present invention relates to a method of and an apparatus for generating high-resolution binary image data with respect to linear edges. More particularly, it relates to a method of and an apparatus for scanning binary (e.g., black-and-white) originals including characters, maps, illustrations or the like in an image scanning/recording apparatus such as an electronic process scanner or a facsimile to input image data of multi-gradation (the grandient corresponds to black areas in read pixels in the black-and-white case, for example), thereby to generate binary image data having a higher resolution than the read resolution from the inputted multi-gradation image data.

2. Description of the Prior Art

In the case of scanning originals to input image data into a general image scanning/recording apparatus, the resolution of the obtained input image data is restricted by technical or economical limitations. In the case of an electronic process drum scanner, for example, a practical number of scanning lines is about 400 lines/inch (input resolution of 62.5 μm square).

On the other hand, higher resolution is required in the field of commercial printing and publication printing requiring high quality, and it is believed that the resolution preferably exceeds 1500 lines/inch (16.9 μm square) so that no indentation appears on edge portions of the output images in a binary image processing system for scanning/inputting binary images and performing some image processing to output the same in the same size in magnification, for example. On the premise of the same-size processing, therefore, high resolution of the said degree is also required in the input side. However, a binary image input system capable of reading at a resolution exceeding 1500 lines/inch is considerably high-priced. Further, the process time is increased when sub-scanning is made per line at such a resolution.

Therefore, the inventor has proposed a high resolution technique of obtaining binary image data higher in resolution than input image data and with a higher fidelity than the original through a conventional low-resolution image input system without employing a high-resolution binary image input system such as in copending application U.S. Ser. No. 915,680 entitled "Method of and Apparatus for Generating High-Resolution Bilevel Image Data". In this method, however, reproducibility with respect to the original is extremely high, whereby fine fluctuation included in linear edges of the original is also reproduced in fidelity. Accordingly, the corresponding highly resolved edge portions are indented. Indentations particularly caused in linear edges parallel with or perpendicular to the scanning lines (i.e., in conformity to the main scanning or sub-scanning direction) are unsightly and the data are increased in number when the same are subjected to run-length compression in past processing to disadvantageously increase the process time.

SUMMARY OF THE INVENTION

The present invention is directed to a method of and an apparatus for generating smooth high-resolution binary image data with respect to linear edge portions of binary originals in generation of high-resolution binary image data, i.e., having a higher resolution than the read resolution, from multi-gradation image data obtained by reading the binary originals.

According to the present invention, multi-gradation image data are stored by prescribed image regions about a pixel to be processed to detect such pixels corresponding to linear edge portions of the originals in conformity to the scanning direction. Mutual gradients thereof are compared to generate highly resolved binary image data forming smooth linear edges at a high resolution having average density responsive to detected gradients, thereby to smoothly generate linear edges in conformity to the scanning direction.

Accordingly, it is an object of the present invention to provide, for generating binary image data higher in resolution than input image data and with a higher fidelity than the originals, through a general low-resolution image input system, without employing high-resolution binary image input processing, a method of and an apparatus for generating high-resolution binary image data. This method causes substantially no indentation in corresponding highly resolved edge portions even if fine fluctuation is caused in linear edges of the originals in conformity to the scanning direction.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 2a–2d are an explanatory diagram showing an example of run-length compression;

FIG. 4 is a block diagram of an image data extracting circuit;

FIGS. 6a–6d and 7a–7d are explanatory diagrams showing image processing procedures;

FIGS. 8A to 8C are explanatory diagrams showing examples of highly resolved binary image data patterns;

FIGS. 9a–9c, 10 and 11a–11b are explanatory diagrams of image processing procedures;

FIG. 15 is a block diagram of a linear edge detecting circuit;

FIGS. 16a–16e illustrate linear edge patterns;

FIG. 17 is a block diagram of a linear pattern discriminating circuit;

FIG. 18 is an explanatory diagram of the operation for highly resolving linear edge;

FIGS. 19 and 20 are explanatory diagrams of processing for generating highly resolved data in consideration of linearity; and FIG. 21 is a block diagram showing a second high-resolving circuit.

DESCRIPTION OF THE PREFERRED EMBODIMENTS

Figure 1:
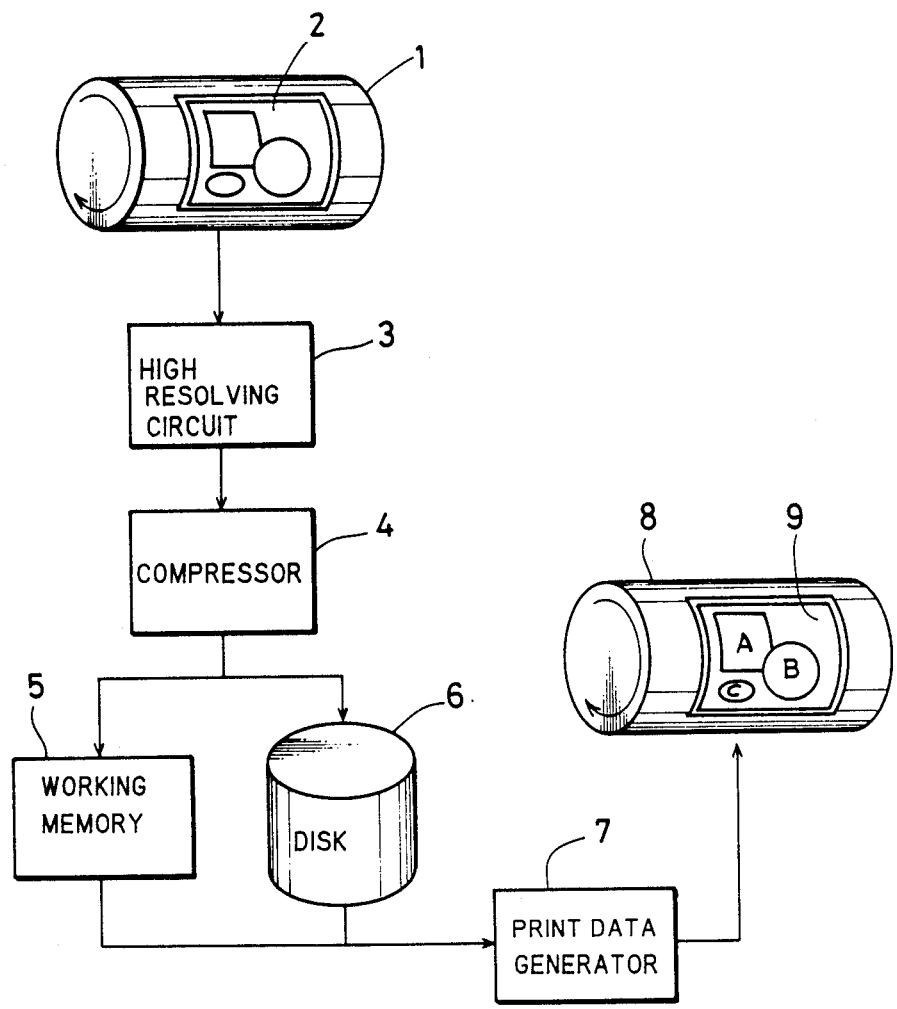
FIG. 1 is a block diagram showing an exemplary structure of a drum-type electronic process scanner to which the present invention is applied.

FIG. 1 is a block diagram showing exemplary structure of a drum-type electronic process scanner to which the present invention is applied. A layout block copy 2 for designating the layout of the final print is mounted on an input drum 1, and binary (e.g., black and white—the following description is made on the black and white case) layout indicating lines are previously drawn on the layout block copy 2 by a drafting machine. A photomultiplier (not shown) photoelectrically scans the layout block copy 2 to obtain analog signals, which are converted by an A-D converter (not shown) into multi-gradation image data to be inputted to a high-resolving circuit 3. Each gradation value of the multi-gradation image data corresponds to the black area (i.e., integration density) in each read pixel. The aforementioned photomultiplier may be replaced by any photoreceiving element capable of reading originals as variable-density images having gradations, such as a CCD image sensor, for example.

As hereinafter described in detail, the high resolving circuit 3 is adapted to generate binary image data having a resolution higher than the resolution read through the gradient in the multi-gradation image data as obtained. In the following description, the term "pixels" indicates those in original read resolution, while the outputted pixels of higher resolution are termed as "highly resolved pixels".

The generated high-resolution binary image data are subjected to run-length compression through a compressor 4, to be stored in a working memory 5 or a disk 6. If no data compression is performed at this time, the data amount is so extremely increased by a high resolving operation that it is difficult to write the same in the working memory 5 or the disk 6 in real time.

FIG. 2 is an explanatory diagram showing an example of run-length compression. For example $x_2$-th and $x_5$-th lines of high resolution binary image data as shown at FIG. 2(a) are compressed as shown at FIGS. 2(c) and (d) along the compressed data format as shown at FIG. 2(b). The format bit p indicates compressed data of the highly resolved binary image data "1" when the same is high while indicating compressed data of the high resolution binary image data "0" when the same is low, and symbol r indicates the length (run-length) of the compressed data.

A print data generator 7 as shown in FIG. 1 produces print data on the basis of the data from the layout block copy 2 and separately prepared image data, to output the same to an exposure head (not shown). Thus, various factors A, B and C such as characters, line drawings and photographs are printed on a film 9 mounted on an output drum 8 along desired layout. Since layout boundary lines are conspicuous at this time, particularly these portions are preferably not indented.

Figure 3:
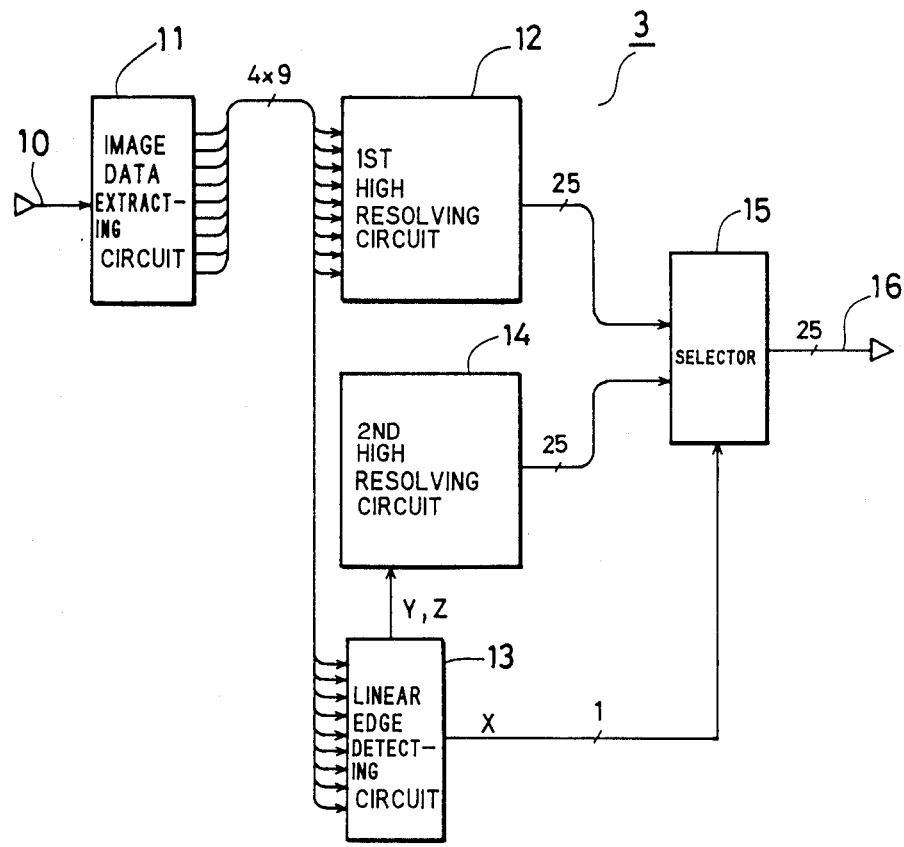
FIG. 3 is a block diagram showing an example of a high-resolving circuit to which the present invention is applied.

FIG. 3 is a block diagram showing an embodiment of the high resolving circuit 3. An input end 10 receives the image data obtained by reading binary originals in a multi-gradation manner, as hereinabove described. While the tonal range can be arbitrarily selected, the following description is made in the case of inputting the image data as data of 16 gradations (4 bits). The inputted multi-gradation image data are supplied to an image data extracting circuit 11, which in turn extracts image data for prescribed regions with respect to pixels to be processed. The following description is made in the case of extracting image data of 3×3 pixels and processing the same.

A first high resolving circuit 12, which has been proposed in U.S. Ser. No. 915,680, receives the image data of 3×3 pixels, to output binary image data obtained by highly resolving a central pixel in response to a combination of the gradation value of the central pixel in the 3×3 region and data patterns of peripheral pixels thereof. On the other hand, a linear edge detecting circuit 13 detects whether or not the central pixel corresponds to a linear edge portion, to output a mode signal Y indicating the linear pattern and density (gradient) data Z relating to the central pixel to a second high-resolving circuit 14 if the central pixel corresponds to the linear edge. The second high-resolving circuit 14 receives the signals Y and Z to output binary image data obtained by highly resolving the central pixel of the linear edge. At this time, such consideration is made that substantially no rattling is caused in the linear edge, as hereinafter described. The first and second high-resolving circuits 12 and 14 and the linear edge detecting circuit 13 are hereinafter described in detail.

The highly resolved binary image data on the central pixel thus generated is selected by a selector 15, so that an output end 16 outputs the high resolution binary image data from the second high-resolving circuit 14 when the central pixel is a linear edge and outputs the high resolution binary image data from the first high-resolving circuit 12 in the other case. The selection state of the selector 15 is controlled by a linear edge detecting signal X from the linear edge detecting circuit 13. The degree of high resolving may generally be determined in response to the smoothness required for the output image.

FIG. 4 is a block diagram showing an exemplary structure of the image data extracting circuit 11 as shown in FIG. 3 in detail. Data on respective 4-bit pixels of the 16 gradation image data inputted in an input end 22 are sequentially stored in a line memory 23 under control by timing control means (not shown) while pixels to be processed are fetched from the input end 22 and the line memory 23 to a latch circuit 24 to be sequentially stored. The line memory 23 is formed by two 4-bit line memories 23a and 23b for storing the inputted 16 gradation image data by one line respectively, which 4-bit line memories 23a and 23b are connected in series from the input end 22. The latch circuit 24 includes nine 4-bit latches for storing image data for one pixel respectively, wherein 4-bit latches 24i, 24h and 24g are connected in series from the input end 22, 4-bit latches 24f, 24e and 24d are connected in series from the output end of the memory 23a and 4-bit latches 24c, 24b and 24a are connected in series from the output end of the 4-bit line memory 23b.

In such connection, image data in the 3×3 pixel region of the input image are sequentially fetched in the latch circuit 24 through an appropriate timing control method. Assuming that the main scanning direction and the sub-scanning direction for reading the image are as shown by arrows at FIG. 6(a), for example, respective pixels A to I in the 3×3 pixel region are fetched in the latch circuit 24 in accordance with the positional relation indicated by subscripts A to I of the blocks of the respective 4-bit latches 24a to 24i as shown in FIG. 4.

Figure 5:
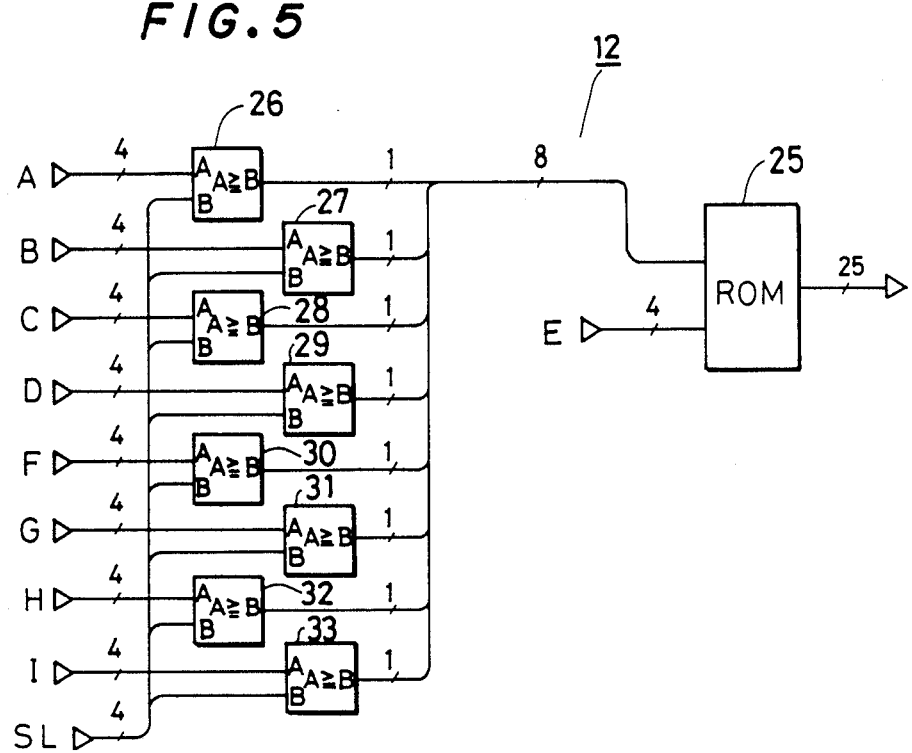
FIG. 5 is a block diagram of a first high-resolving circuit.

FIG. 5 is a block diagram showing an exemplary structure of the first high-resolving circuit 12 as shown in FIG. 3 in detail. Within the image data in the 3×3 pixel region fetched in the aforementioned manner, the image data on a central pixel E are inputted in a ROM 25 and respective image data on peripheral pixels A, B, C, D, F, G, H and I are inputted in first inputs of comparators 26 to 33 respectively. Second inputs of the comparators 26 to 33 are supplied with a threshold value SL corresponding to prescribed density, so that the comparators 26 to 33 discriminate the inputted image data by the threshold value SL to digitize and output the same. While the value of the threshold SL is hereinafter discussed, the following description is made on the case of digitizing the data by the threshold value SL=8 representing the central gradient (corresponding to black density of 50%) in the 16 gradation range. In this case, the structure is further simplified by not employing the comparators 26 to 33, but employing only the most significant bits of the respective peripheral pixel data A to D and F to I.

Thus, the data of 12 bits in total on the central pixel of 16 gradations (four bits) and the binary (one-bit) peripheral pixels A, B, C, D, F, G, H and I are supplied to the address inputs of a ROM 25. The address inputs represent combinations of the gradation value of the central pixel in the 3×3 pixel region of the input image and data patterns of the peripheral pixels, and the ROM 25 previously stores binary data patterns of highly resolved pixels obtained by highly resolving the central pixel to 5×5 in correspondence to respective combinations (i.e., respective addresses). In response to the supplied address inputs, the ROM 25 reads the binary data patterns (25 bits in total) of the 5×5 highly resolved pixels stored in the addresses thereof.

With reference to FIGS. 6 and 7, description is now briefly made on the procedure of the processing in the first high-resolving circuit 12 as shown in FIG. 3 on the basis of a specific example.

(1) First, binary originals (indicated by 3×3 pixels in the figures) as shown at FIGS. 6(a) and 7(a) are read as 16-gradation image data, and stored as 3×3 pixels in the latch circuit 24 (see FIG. 4) as shown at FIGS. 6(b) and 7(b).

(2) Then, the peripheral pixels A to D and F to I are digitized with "1" when data $\geq 8$ and "0" when data $<8$ by a previously set threshold value SL=8. FIGS. 6(c) and 7(c) illustrate such states.

(3) In response to the combinations of the gradation values of the central pixels E and the data patterns of the peripheral pixels A to D and F to I as shown at FIGS. 6(c) and 7(c), the highly resolved data of the central pixels E as shown at FIGS. 6(d) and 7(d) are read from the ROM 25 of FIG. 5.

Figure 8A:
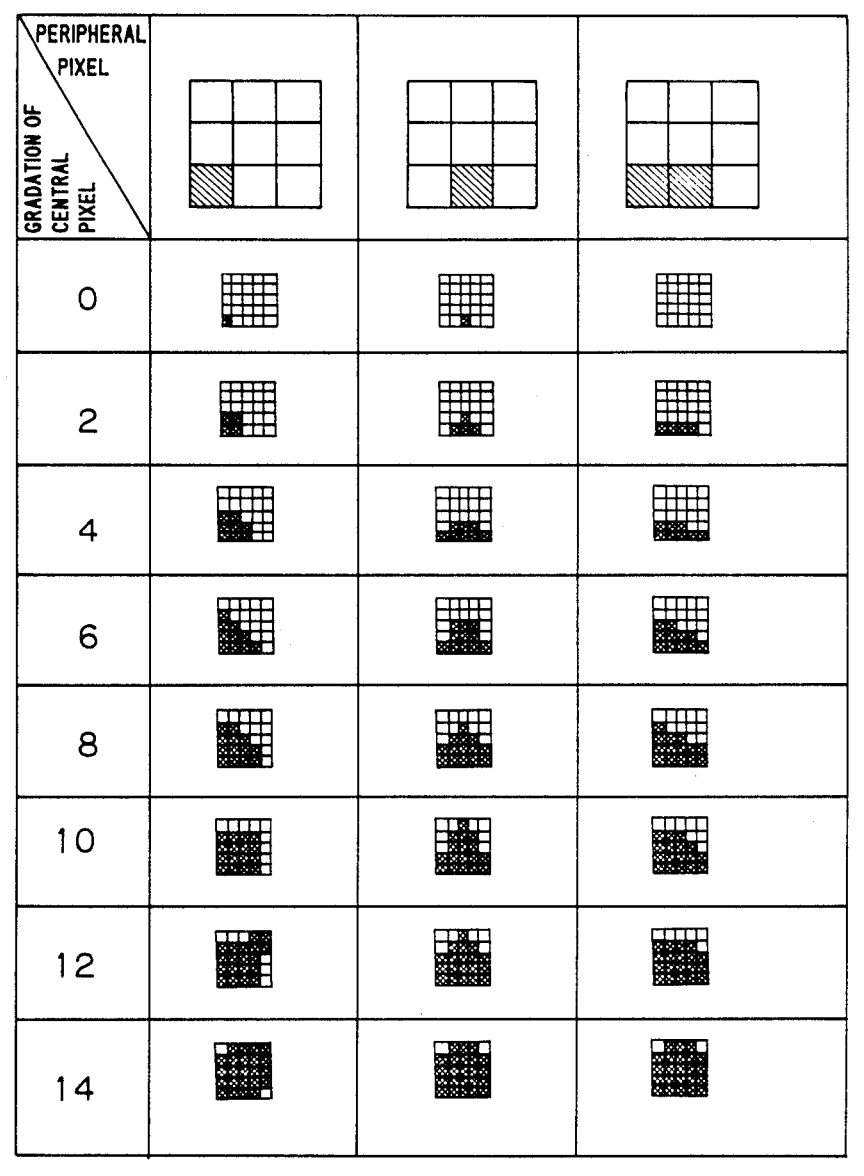
Figure 8B:
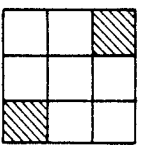
Figure 8C:
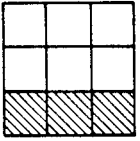

The highly resolved data may be obtained by a calculator with respect to all of combinations of the gradation values of the central pixels and the data patterns of the peripheral pixels through an appropriate algorithm, or respective data may be artificially obtained to make edge portions as smooth as possible. FIGS. 8A to 8C illustrate examples of artificially obtained highly resolved data of 5×5 times.

The aforementioned method is disadvantageous in processing of lines thinner than the read pixels. When, for example, a binary original formed by lines thinner than read pixels as shown at FIG. 9(a) is read in 16 gradations, the gradation values of 3×3 pixels are as shown at FIG. 9(b), while peripheral pixels A to D and F to I are digitized with SL= 8 as shown at FIG. 9(c). Namely, data on fine lines are dissipated with respect to the portion of the pixel C at FIG. 9(c), and correct highly resolved data cannot be obtained by highly resolving the central pixel E on the basis thereof. When, in a method, the peripheral pixels are increased in gradation width to be in four gradations (two bits), the fine lines can be correctly recognized as shown in FIG. 10. In this case, however, the entire data pattern number of the peripheral pixels is largely increased from $2^8$ to $4^8$ ($=2^{16}$), and hence the capacity of the ROM 25 must be substantially increased in response.

In another method, the threshold value SL as shown in FIG. 5 may be changed in digitizing the peripheral pixels. Namely, the average density of the read region is reduced when an original formed by extremely thin lines is processed, and hence the threshold value SL is responsively reduced so that the data on the fine lines in the peripheral pixels are not dissipated when the multi-gradation peripheral pixel data are digitized.

Figure 12:
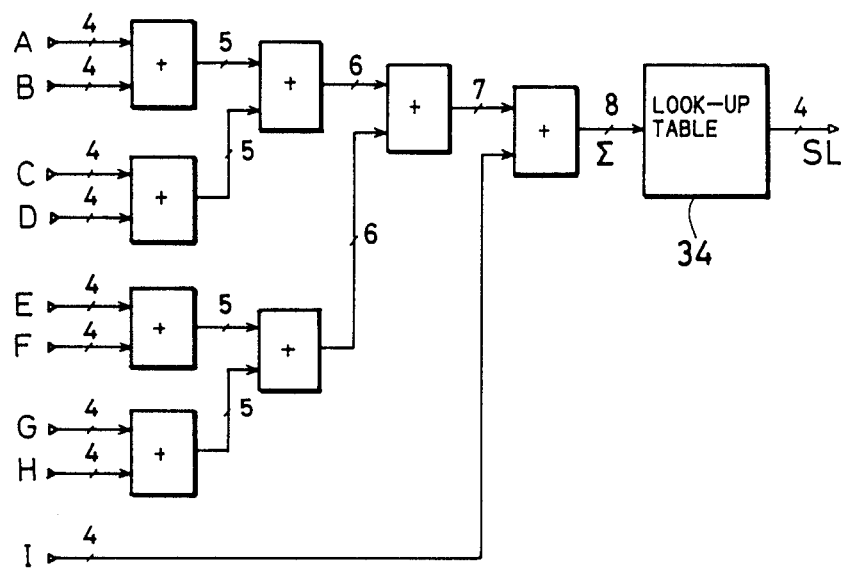
FIG. 12 is a block diagram of a threshold value determination circuit.

FIG. 12 is a block diagram showing an example of a threshold value deciding circuit for performing such an operation. In this circuit, the threshold value SL of FIG. 5 is automatically set using a predetermined algorithm in response to input images. Namely, the sum $\Sigma$ of respective 4-bit input image data is obtained thereby to calculate the area of the black (solid) portion in the 3×3 pixel region. In response to the calculated area of the black portion, the 4-bit threshold value SL previously stored in a look-up table 34 is read to be supplied to the eight comparators 26 to 33 as shown in FIG. 5. Thus, the black area is reduced in the case of an original formed by fine lines for example, whereby the threshold value SL can be automatically reduced in response.

Figure 13:
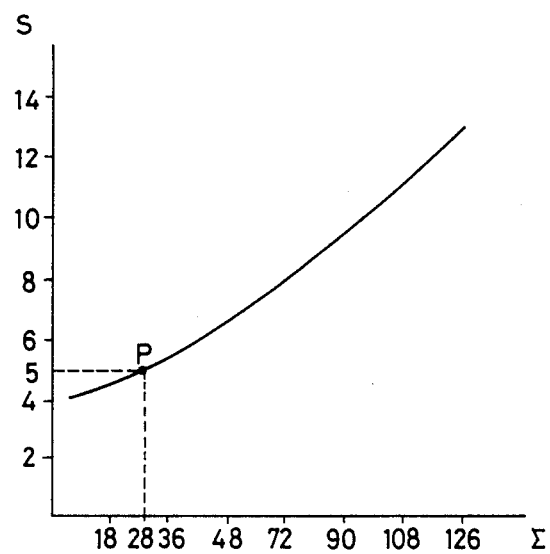
FIG. 13 illustrates examples of threshold values.

FIG. 13 is a graph showing an example of the threshold value SL to be previously stored in the look-up table 34 of FIG. 12. Consider the case of processing the binary image of FIG. 9(a) through the look-up table data. FIG. 9(b) shows the gradation values of the read pixels. The sum $\Sigma$ obtained from the gradation values through the circuit of FIG. 12 is 28. This sum $\Sigma$ refers to a point P in FIG. 13, and the threshold value SL outputted from the look-up table 34 at this time is equal to 5. With respect to this threshold value, the peripheral pixels of FIG. 9(b) are digitized as shown at FIG. 11(a), to sufficiently express directivity of the highly resolved data of the central pixel. FIG. 11(b) shows the highly resolved data read from the ROM 25 at this time. The aforementioned structure has been proposed in U.S. Ser. No. 915,680.

Figure 14A:
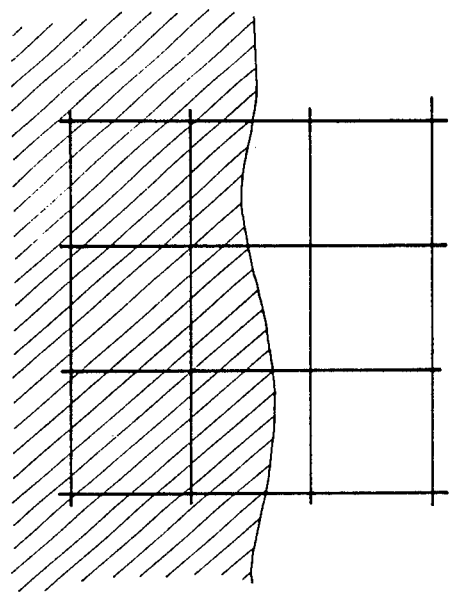
FIGS. 14a–14c illustrate the operation of highly resolving linear edges.
Figure 14B:
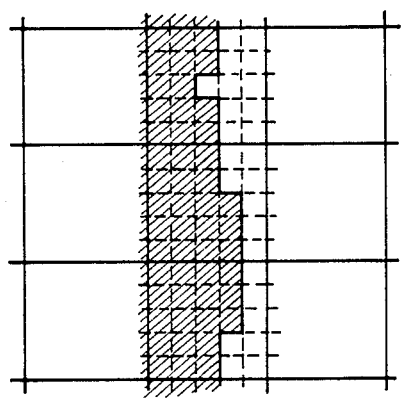
Figure 14C:
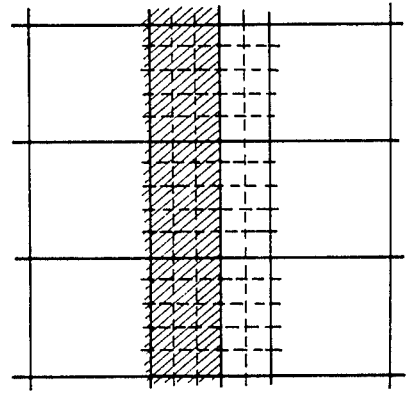

Bent data such as characters are reliably and smoothly high-resolved to be outputted by executing the high resolving processing in the aforementioned first high-resolving circuit 12. However, this method is of extremely high reproducibility, and hence fine fluctuation of a linear edge is reproduced in too much fidelity to cause indentation in the edge portion when this method is applied to a linear edge, particularly that extending in a parallel direction (main scanning direction) or a perpendicular direction (sub-scanning direction) with respect to scanning lines. FIG. 14(a) shows a finely fluctuating linear edge extending in the main scanning direction, and FIG. 14(b) shows the linear edge resolved by 5×5 times through the aforementioned method. Such an indentation of the boundary edge is unsightly and causes an increase in the data number in run-length compression of the data along the scanning lines in postprocessing as hereinabove described with reference to FIG. 2, leading to increased process time. Thus, required is a method of highly resolving/digitizing the finely fluctuating linear edge as shown at FIG. 14(a) as a non-irregular boundary line as shown at FIG. 14(c).

The linear edge detecting circuit 13 and the second high-resolving circuit 14 as shown in FIG. 3 are provided for such a purpose, and the linear edge detecting circuit 13 analyzes the image data of the 3×3 pixel region extracted by the image data extracting circuit 11, to determine whether or not the central pixel corresponds to the linear edge portion. The central pixel corresponding to the linear edge portion is subjected to high resolving/digitizing processing in consideration of linearity by the second high-resolving circuit 14, to obtain the highly resolved/digitized data with no indentation as shown at FIG. 14(c).

FIG. 15 is a block diagram showing an example of the linear edge detecting circuit 13. This linear edge detecting circuit 13 is functionally divided into a linear pattern discriminator 35 and another circuit part, which are hereinafter described in detail. Briefly stated, the linear pattern discriminator 35 discriminates to which one of a plurality of linear patterns the central pixel corresponds and the other circuit part provides prescribed equivocation to the gradient (density) of an immediate front central pixel and the gradient of the central pixel to be processed.

FIGS. 16(b) to 16(e) illustrate four types of linear patterns of the central pixel to be discriminated, and the linear pattern discriminator 35 determines to which one of the linear patterns b to d the central pixel E of the 3×3 pixel region as shown at FIG. 16(a) corresponds. For example, the determination algorithm is as follows:

(1) Conditions where the central pixel corresponds to the pattern b:
 (i) B>H and difference in gradient exceeds k%;
 (ii) difference between A and C is less than l% with respect to A;
 (iii) difference between D and F is less than m% with respect to E; and
 (iv) difference between G and I is less than n% with respect to H.

When all of the above conditions are simultaneously satisfied, the central pixel E corresponds to the pattern b.

(2) Conditions where the central pixel E corresponds to the pattern c:
 (i') B<H and difference therebetween exceeds k%;
 (ii) difference between A and C is less than l% with respect to B;
 (iii) difference between D and F is less than m% with respect to E; and
 (iv) difference between G and I is less than n% with respect to H.

When all of the above conditions are simultaneously satisfied, the central pixel E corresponds to the pattern c.

(3) Conditions where the central pixel E corresponds to the pattern d:
 (v) D>F and difference therebetween exceeds k'%;
 (vi) difference between D and G is less than l'% with respect to D;
 (vii) difference between B and H is less than m'% with respect to E; and
 (viii) difference between C and I is less than n'% with respect to F.

When all of the above conditions are simultaneously satisfied, the central pixel E corresponds to the pattern d.

(4) Conditions where the central pixel E corresponds to the pattern e:
 (v') D<F and difference therebetween exceeds k'%;
 (vi) difference between A and G is less than l'% with respect to D;
 (vii) difference between B and H is less than m'% with respect to E; and
 (viii) difference between C and I is less than n'% with respect to F.

When all of the above conditions are simultaneously satisfied, the central pixel E corresponds to the pattern e.

FIG. 17 is a block diagram showing exemplary circuit structure of the linear pattern discriminator 35 for executing the aforementioned algorithm. Comparators 36 to 42 are adapted to discriminate the linear patterns b and c and comparators 43 to 49 are adapted to discriminate the linear patterns d and e. The aforementioned values k, k', l, l', m, m', n and n' are preset in the comparators 36 to 49 as discrimination values. These discrimination values are set, for example, such that k and k' exceed 80 to 85% and other values are less than 20%.

In order to discriminate the vertical linear patterns b and c, the comparator 36 detects whether or not either the condition (i) or (i') is satisfied, while the comparators 37 and 38 detect whether or not the condition (ii) is satisfied, the comparators 39 and 40 detect whether or not the condition (iii) is satisfied, and the comparators 41 and 42 detect whether or not the condition (iv) is satisfied. In case of the vertical linear pattern b, the conditions (i), (ii), (iii) and (iv) are simultaneously satisfied while the output P from an AND gate 50 becomes a logic "1" and the output Q (indicating whether B>H or B<H) from the comparator 36 becomes a logic "0". In case of the vertical linear pattern c, the conditions (i'), (ii), (iii) and (iv) are simultaneously satisfied while the output P from the AND gate 50 becomes a logic "1" and the output Q from the comparator 36 becomes a logic "1".

In order to discriminate the lateral linear patterns d and e, the comparator 43 detects whether or not either the condition (v) or (v') is satisfied, and the comparators 44 and 45 detect whether or not the condition (vi) is satisfied. The comparators 46 and 47 detect whether or not the condition (vii) is satisfied and the comparators 48 and 49 detect whether or not the condition (viii) is satisfied. In case of the lateral linear pattern d, the conditions (v), (vi), (vii) and (viii) are simultaneously satisfied while the output R from an AND gate 51 becomes a logic "1" and the output S (indicating whether D>F or D<F) from the comparator 43 becomes a logic "0". In case of the lateral linear pattern e, further, the conditions (v'), (vi), (vii) and (viii) are simultaneously satisfied while the output R from the AND gate 51 becomes a logic "1" and the output S from the comparator 43 becomes a logic "1".

Thus, the output P becomes a logic "1" when the central pixel E corresponds to the vertical linear pattern b or c while the output R becomes a logic "1" when the central pixel E corresponds to the lateral linear pattern d or e. At this time, it is recognized that whether the central pixel E is the vertical linear pattern b or c or whether the same is the lateral linear pattern d or e is determined by referring to the outputs Q and S.

When the central pixel E is thus recognized to be a linear edge, highly resolved data may be produced by increasing/decreasing the black area in the patterns b to e in response to the density (gradient) of the central pixel E to be outputted as highly resolved/digitized data with respect to the central pixel E. However, it is anticipated that, when the highly resolved data reflecting the density in fidelity are produced with only the density of the central pixel E under processing being noted, the linear edge may be indented as a whole although the edge is definitely smooth along successive pixels as shown in FIG. 18. In order to cope with this, for example, it is effective to provide the density of the central pixel E with equivocation or hysteresis to some extent.

In the circuit as shown in FIG. 15, the circuit part other than the aforementioned linear pattern discriminator 35 is provided for such a purpose. The equivocation $j\%$ is preset as a reference value in comparators 52 and 53. The comparator 52 compares the density (gradient) of the central pixel E under processing with the density of a former central pixel E' latched in a latch 54 with respect to the vertical linear edge, to supply a condition judging circuit 55 with a signal $T_1$ having logic "0" when the said difference is less than $j\%$ and having logic "1" when the same exceeds $j\%$. The condition judging circuit 55 is further supplied with the outputs P and Q of the linear pattern discriminator 35 and an output P (indicated as P') with respect to the central pixel one clock ahead thereof, i.e., the immediate front central pixel latched in the latch 56 respectively. On the basis of inputs P', P and $T_1$, the condition judging circuit 55 produces gate control signals U and V for respectively opening/closing gates 57 and 58, in accordance with the following Table 1.

TABLE 1

| Input | | | Output | |
|---|---|---|---|---|
| P' | P | $T_1$ | U | V |
| — | 0 | — | 0 | 0 |
| 0 | 1 | — | 0 | 1 |
| 1 | 1 | 0 | 0 | 1 |
| 1 | 1 | 1 | 1 | 0 |

FIG. 19 is an explanatory diagram showing processing with respect to the vertical linear edge. The left-end part illustrates the state of reading a binary original in the vertical linear pattern and the right-end part illustrates the highly resolved/digitized data of the central pixels recorded as the result of the processing. Referring to FIG. 19, the vertical linear pattern is first recognized in case of a central pixel $E_3$ so that P=1, and P' (immediate front value P) is zero at this time. Therefore, the gate control signal U=1 is produced by Table 1 to be outputted, thereby to open the gate 57 shown in FIG. 15. Thus, the data of the current central pixel $E_3$ passes through the gate 57 to be latched in a latch 59, and outputted as density data Z. On the other hand, the data of $E_3$ is latched in the latch 54, to become a reference data E' for comparison. In the case of central pixels $E_1$ and $E_2$, P=0 and U=V=0 from Table 1, whereby the gates 57 and 58 remain closed.

With respect to a subsequent central pixel $E_4$, the comparator 52 compares $E_3$ (=E') with $E_4$ and determines that the density difference therebetween is within $j\%$ (i.e., $E_4 \approx E_3$) to output $T_1=0$. P=P'=1 at this time, whereby the gate control signal V=1 is produced by Table 1 to be outputted, thereby to open the gate 58. Thus, the data of the former central pixel $E_3$ latched in the latch 54 passes through the gate 58 to be outputted, while the data is again latched in the latch 54. Similar operation is continued to a central pixel $E_9$, and the data of $E_3$ is continuously outputted as the density data Z during this time. In the case of a central pixel $E_{10}$, $E_{10} \neq E_3$ (i.e., density difference between $E_{10}$ and $E_3$ exceeds $j\%$) for the first time, and the comparator 52 outputs $T_1=1$ at this time. Further, P=P'=1 at this time, whereby the gate control signal U=1 is produced by Table 1 to be outputted, thereby to open the gate 57. Thus, the data of the current central pixel $E_{10}$ passes through the gate 57 to be outputted as the density data Z from the latch 59, while the data of $E_{10}$ is latched in the latch 54 to now become E'.

Thus, with respect to the central pixel first recognized as the linear pattern, the data (referred to as e) thereof is outputted as the density data Z, to be stored as reference data. With respect to the subsequent central pixel of the linear pattern, the data (referred to as e') thereof is compared with the aforementioned data e to output the data e when the difference therebetween is within $j\%$ while outputting e' in place of e when the said difference exceeds $j\%$, to re-store e' as new reference data. The density data Z thus outputted is provided with the equivocation or hysteresis of $j\%$ with respect to the actual density value of the central pixel.

With respect to the lateral linear edge, on the other hand, the comparator 53 shown in FIG. 15 compares the density of the current central pixel E with the density of a former central pixel E'' latched in a latch 60 to supply the condition judging circuit 55 with a signal $T_2$ having a logic "0" when the difference therebetween is within $j\%$ or having a logic "1" when the said difference exceeds $j\%$. The condition judging circuit 55 is further supplied with the outputs R and S from the linear pattern discriminator 35 as well as an output R (indicated as R') with respect to a central pixel one line ahead thereof as stored in a memory 61, i.e., a transversely continuous immediate front central pixel from the latch 60. The output R' is read, together with the aforementioned former central pixel E'', from the memory 61 in the latch 60 in accordance with an address generated by an address generator 63 under control by a timing control 62. Simultaneously with reading of R from the memory 61, a new R is written in the memory 61 through a data writing gate 64 under control by the timing control 62. Thus, the memory 61 always stores R immediately ahead by one line.

On the basis of inputs R', R and $T_2$, the condition judging circuit 55 produces gate control signals U and W for opening/closing gates 57 and 65 in accordance with Table 2.

TABLE 2

| Input | | | Output | |
|---|---|---|---|---|
| R' | R | $T_2$ | U | W |
| — | 0 | — | 0 | 0 |
| 0 | 1 | — | 1 | 0 |
| 1 | 1 | 0 | 0 | 1 |
| 1 | 1 | 1 | 1 | 0 |

Figure 20:
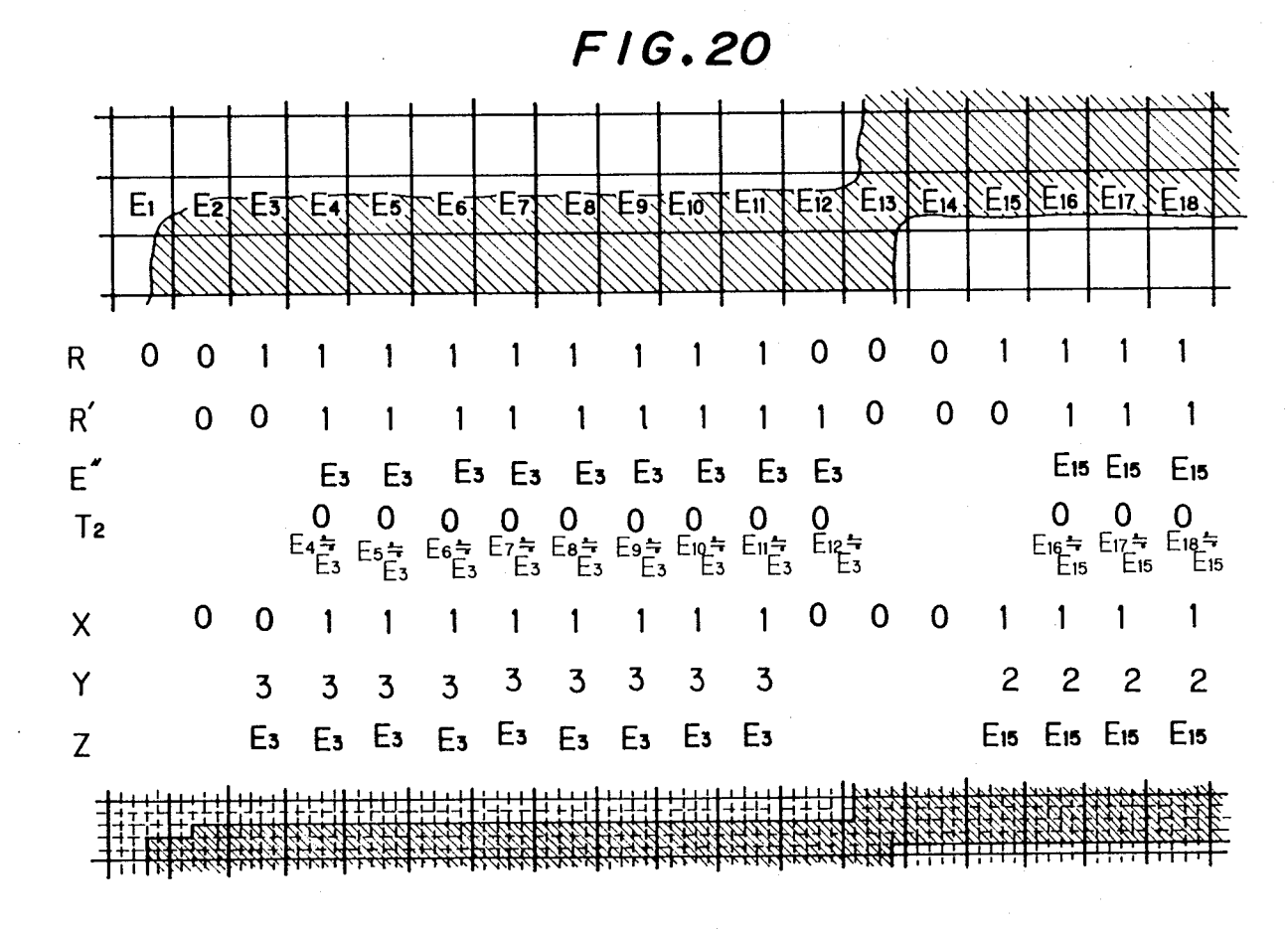

Similarly to the manner as hereinabove described with reference to FIG. 19, density data outputs Z shown in FIG. 20 can be obtained with respect to the lateral linear edges shown in the figure. The density data Z are outputted through a latch 59, while W=1 from Table 2 when R=R'=1 and $T_2=0$, and E'' is written through the gate 65 and the data writing gate 64 in the memory 61 under control of the timing control 62 and read from the memory 61 in the latch 60 in processing of a central pixel laterally rearwardly adjacent by one line, to become reference data E″ for comparison.

Further, the condition judging circuit 55 produces a one-bit linear edge detecting signal X representing whether or not the central pixel is a linear edge on the basis of the inputs P and R, as shown in Table 3.

TABLE 3

| Input | | Output |
|---|---|---|
| P | R | X |
| 0 | 0 | 0 |
| 1 | 0 | 1 |
| 0 | 1 | 1 | where detection of the linear edge is represented when X=1.

The condition judging circuit 55 further produces a two-bit linear edge pattern signal representing four types of linear edge patterns (b to d in FIG. 16) on the basis of the inputs Q and S, as shown in Table 4.

TABLE 4

| Input | | | | Output |
|---|---|---|---|---|
| P | R | Q | S | Y |
| 1 | 0 | 0 | — | 0 |
| 1 | 0 | 1 | — | 1 |
| 0 | 1 | — | 0 | 2 |
| 0 | 1 | — | 1 | 3 |

Y=0, 1, 2 and 3 respectively correspond to the patterns b to e in FIG. 16. These signals X and Y are latched by one clock period in a latch 66 to be outputted.

FIG. 21 is a block diagram showing the second high-resolving circuit 14 shown in FIG. 3. In this embodiment, the second high-resolving circuit 14 is formed by a ROM 73, which receives the linear edge pattern signal Y and the density data Z in its address inputs to output highly resolved data corresponding to the addresses. The ROM 73 previously stores 5×5 highly resolved/-digitized data obtained by increasing/decreasing the black areas of the patterns b to e of FIG. 16 represented by the linear edge pattern signal Y in response to the density represented by the density data Z. Thus, the highly resolved data as shown in FIGS. 19 and 20 are obtained and the highly resolved data are generated with the hysteresis of j%, whereby a sightly linear edge can be obtained with no indentation as shown in the figures.

The selector 15 of FIG. 3 receives the linear edge detecting signal X to select the output data of the first high resolving circuit 12 when X=0 while selecting the output data of the second high resolving circuit 14 when X=1. Thus, highly resolved data in consideration of linearity in the second high resolving circuit are always outputted at the output end 16 when the central pixel is recognized as the linear edge, and the linear edge is not substantially indented even if the first high resolving circuit 12 performs accurate high resolving processing.

Although the linear edge pattern is discriminated by mutually comparing the gradients of the respective pixels in the 3×3 pixel region in the above embodiment, discrimination can be executed in an arbitrary pixel region.

According to the present invention as hereinabove described, implemented are a method of and an apparatus for generating high resolution binary image data without substantially causing indentation in corresponding highly resolved edge portions, even if the linear edge of originals being in conformity to the scanning direction has a fine fluctuation caused when generating binary image data in higher resolution and with higher fidelity than the originals. Processing is obtained from input image data through a conventional low resolution image input system without utilizing any high resolution binary image processing.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of generating smooth high-resolution binary image data with respect to a linear edge portion of a binary original for generating high-resolution binary image data with a higher resolution than a read resolution from multi-gradation image data obtained by reading said binary original, said method comprising the steps of:

storing said multi-gradation image data by prescribed image regions about a pixel to be processed;

mutually comparing gradients of respective stored pixels to detect a pixel to be processed corresponding to the linear edge portion of said original being in conformity to the scanning direction; and generating high-resolution binary image data forming a smooth linear edge with said higher resolution having an average density responsive to the gradient of said pixel to be processed upon detection of the pixel to be processed of the linear edge portion of said original being in conformity to the scanning direction.

2. A method of generating high-resolution binary image data with respect to linear edges in accordance with claim 1, wherein said step of detecting said pixel to be processed corresponding to said linear edge portion of said original being in conformity to the scanning direction includes the step of detecting to which one of four patterns, i.e., a left solid vertical linear pattern, a right solid vertical linear pattern, a top solid lateral linear pattern and a bottom solid lateral linear pattern, a linear edge corresponds, and said step of generating high-resolution binary image data includes the steps of (1) previously storing high-resolution binary image data patterns obtained by increasing/decreasing solid areas of said four patterns in response to the gradients of said pixel to be processed and (2) reading any of said stored high-resolution binary image data patterns on the basis of the gradients of said pixel to be processed and said detected linear edge pattern.

3. A method of generating high-resolution binary image data with respect to linear edges in accordance with claim 1, wherein said step of generating high-resolution binary image data further includes the step of providing prescribed equivocation to the gradient of said pixel to be processed in said linear edge portion of said original being in conformity to the scanning direction.

4. An apparatus for generating smooth high-resolution binary image data with respect to a linear edge portion of a binary original in reading said binary original in the form of multi-gradation image data through an image input system to generate high-resolution binary image data having a higher resolution than a read resolution from said multi-gradation image data, said apparatus comprising:

memory means for storing said multi-gradation image data by prescribed image regions about a pixel to be processed;

detecting means for receiving said image data stored in said memory means to mutually compare gradients of the same thereby to detect a pixel to be processed corresponding to the linear edge portion of said original being in conformity to the scanning direction; and data generating means for generating high-resolution binary image data forming a smooth linear edge having said high resolution with an average density responsive to the gradient of said pixel to be processed as detected by said detecting means.

5. An apparatus for generating high-resolution binary image data with respect to linear edges in accordance with claim 4, wherein said detecting means includes means for detecting to which one of four patterns, i.e., a left solid vertical linear pattern, a right solid vertical linear pattern, a top solid lateral linear pattern and a bottom solid lateral linear pattern, a linear edge corresponds, and said data generating means includes means for storing previous high-resolution binary image data patterns obtained by increasing/decreasing solid areas of said four patterns in response to the gradient of said pixel to be processed and means for reading any of said stored high-resolution binary image data patterns on the basis of said gradient of said pixel to be processed and said detected linear edge patterns.

6. An apparatus for generating high-resolution binary image data with respect to linear edges in accordance with claim 4, wherein said data generating means further includes means for providing prescribed equivocation to the gradient of said pixel of said linear edge portion of said original being in conformity to the scanning direction.

* * * * *